United States Patent Office 3,297,520
Patented Jan. 10, 1967

---

3,297,520
INSECTICIDES
Heiner Dickhaeuser and Heinz Pohlemann, Ludwigshafen (Rhine), Herbert Stummeyer, Mannheim, Heinrich Adolphi, Limburgerhof, Pfalz, and Siegfried Winderl, Ludwigshafen (Rhine), Germany, assignors to Badische Anilin- & Soda-Fabrik Aktiengesellschaft, Ludwigshafen (Rhine), Germany
No Drawing. Filed Dec. 5, 1961, Ser. No. 157,254
Claims priority, application Germany, Dec. 10, 1960, B 60,433
4 Claims. (Cl. 167—22).

This invention relates to insecticides and their use in insect control.

It is known that compounds of the general formula:

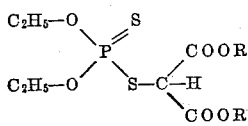

in which R denotes an alkyl or halogenalkyl radical have insecticidal action. They have the disadvantage however that they are not systemically active.

An object of the invention are pest control agents which are effective against insects. A further object of the invention are insecticides having a systemic action, i.e., the agent is distributed via the sap to all parts of the plant. We have found that these objects are achieved by compounds of the general formula:

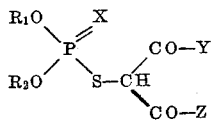

in which $R_1$ and $R_2$ denote alkyl radicals, X denotes oxygen or sulfur and Y denotes a radical of the formula $NR_3R_4$ in which $R_3$ denotes hydrogen or an alkyl radical, $R_4$ denotes hydrogen or an alkyl radical or $R_3$ and $R_4$ together with the nitrogen atom denote a heterocyclic radical, and Z has the same meaning as Y.

Compounds according to this invention may be obtained by reaction of substituted α-halomalonic acid amides of the general formula:

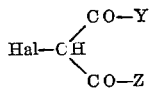

in which Y and Z have the meanings given above and Hal denotes chlorine or bromine, with salts of O,O-dialkylthiolphosphoric acids or O,O-dialkyldithiophosphoric acids.

Suitable O,O-dialkylthiolphosphoric acids and O,O-dialkyldithiophosphoric acids are the ester acids of lower aliphatic alcohols, O,O-dialkylthiolphosphoric acids can readily be prepared in conventional manner from the corresponding alkali salts prepared by adding on sulfur to Na-O,O-dialkyl phosphites, O,O-dialkyldithiophosphoric acids are obtained by acting on phosphorus pentasulfide with the corresponding alcohols.

Examples of suitable O,O-dialkylphosphoric acids are dimethyl-, diethyl-, dipropyl-, di-isopropyl- and dibutyl-thiolphosphoric acids, and dimethyl-, diethyl-, dipropyl-, di-isopropyl- and dibutyldithiophosphoric acids. Examples of salts of O,O-dialkylthiolphosphoric acids and O,O-dialkyldithiophosphoric acids are the sodium, potassium, calcium, magnesium and ammonium salts of dimethyl-, diethyl-, dipropyl-, di-isopropyl- and dibutyl-thiolphosphoric acids, and the sodium, potassium, calcium, magnesium and ammonium salts of dimethyl-, diethyl-, dipropyl-, di-isopropyl- and dibutyldithiophosphoric acids.

The following are given as examples of halomalonic acid amides which may be used for the production of the compounds to be used according to this invention:

α-bromomalonic acid bis-(N-methylamide),
α-chloromalonic acid bis-(N-ethylamide),
α-bromomalonic acid bis-(N,N-diethylamide),
α-bromomalonic acid bis-(N-isopropylamide),
α-bromomalonic acid bis-(N,N-pentamethyleneamide),
α-bromomalonio acid ethyl ester N-methylamide,
α-chloromalonic acid N-methyl-N',N'-dimethylamide,
α-bromomalonic acid N,N-dipropyl-N'-isopropylamide,
α-chloromalonic acid N,N-pentamethyleneamide-N-methylamide and
α-bromomalonic acid isobutyl ester N-ethylamide.

The reaction takes place when the two components are brought together in about equivalent amounts, advantageously in an inert diluent, as for example acetone or methyl ethyl ketone. Reaction takes place slowly even at room temperature but it is more advantageous to work at higher temperatures, for example at temperatures up to 120° C., preferably between 40° and 80° C.

Phosphoric esters for use according to this invention may also be prepared from α-mercaptomalonic acid amides of the general formula:

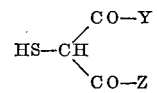

in which Y and Z have the meanings given above, or their salts, by reaction with O-O-dialkylthilonophosphoric acid chlorides or O,O-dialkylphosphoric acid chlorides of the formula:

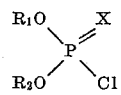

in which $R_1$, $R_2$ and X have the meanings given above, if necessary with the addition of acid-binding agents. About equivalent amounts of the two components are used, advantageously in an inert diluent, as for example benzene, toluene, methylene chloride or chloroform, and they are reacted together at an elevated temperature, preferably between 40° and 80° C. Examples of acid-binding agents are potassium carbonate and tertiary amines, as for example triethylamine or pyridine.

The following examples illustrate the production of the new compounds according to this invention but the invention is not limited to these examples. Parts are by weight.

*Example 1*

20.9 parts of α-bromomalonic-acid-bis-(N-methylamide) is added to a solution of 20.3 parts of O,O-diethyl-dithiophosphoric acid ammonium salt in 100 parts of acetone and the whole heated at 40° to 50° C. for five hours. Substantially all the acetone is then evaporated off in vacuo. The residue is dissolved in chloroform, the solution washed with water, the organic phase separated from the water and dried. The solvent is then removed in vacuo. The crystals which remain are recrystallized from methanol.

The yield is 23.0 parts of colorless crystals of the melting point 162° to 163° C. The new compound has the formula:

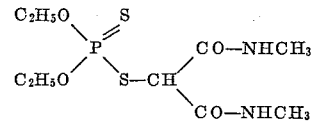

*Example 2*

20.9 parts of α-bromomalonic-acid-bis-(N-methylamide) is added to a suspension of 17.5 parts of O,O-dimethyldithiophosphoric acid ammonium salt in 100 parts of acetone and the mixture is stirred for five hours at 40° to 50° C. The product is worked up as described in Example 1. 8.0 parts of colorless crystals of the melting point 137° to 138° C. is obtained. The new compound has the formula:

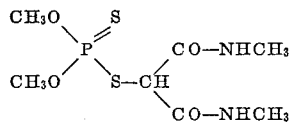

Example 3

20.9 parts of α-bromomalonic-acid-bis-(N-methylamide) is added to a solution of 20.8 parts of S-potassium O,O-diethylthiophosphate in 100 parts of acetone and the mixture heated at 40° to 50° C. for five hours. The product is worked up as described in Example 1 and 23.3 parts of colorless crystals of the melting point 102° to 103° C. is obtained. The new compound has the formula:

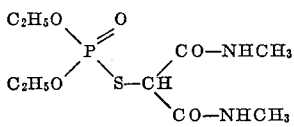

The insecticidal agents according to this invention can be used for the production of dusting agents in the usual way by adding solid extenders or for the production of spraying liquors by adding dispersing, wetting and/or sticking agents to solid or liquid preparations. It is also possible to use the agents according to the invention in the form of emulsions or solutions which can be incorporated in aerosol sprays. It is further possible to use them in admixture with fungicides and/or other insecticides. The following examples illustrate the application of the insecticides according to this invention.

Example 4

Cut shoots of horse bean (*Vicia faba*) are placed in an aqueous emulsion of a substance to be tested. On each of three leaves of a plant, plant lice (*Acyrtosiphon onobrychis*) are placed and retained on the leaves with perforated dishes. The mortality of the lice is determined after 24 hours. The following table gives the results of the test:

| | Active substance | Concentration, percent | Effect |
|---|---|---|---|
| (a) | $C_2H_5O$ $\backslash$ P(=S) / $C_2H_5O$ — S—CH(CO—NHCH$_3$)(CO—NHCH$_3$) | 0.006 | Active. |
| (b) | $CH_3O$ $\backslash$ P(=S) / $CH_3O$ — S—CH(CO—NHCH$_3$)(CO—NHCH$_3$) | 0.006 | Active. |
| (c) | $C_2H_5O$ $\backslash$ P(=S) / $C_2H_5O$ — S—CH(COOC$_2$H$_5$)(COOC$_2$H$_5$) | 0.1 | Inactive. |

Example 5

20 cc. of an aqueous emulsion of the substance to be tested is poured over the soil in flowerpots of 10 cm. diameter in which are growing horse beans (*Vicia faba*) which have developed the first pair of leaves. The leaves of the plants are then infected with plant lice (*Acyrtosiphon onobrychis*) and after one and two days the activity of the substance contained in the water poured on is tested.

The following table gives the results of the test:

| Active substance | Concentration, percent | Effect after— 1 day | Effect after— 2 days |
|---|---|---|---|
| (a) | 0.1 | Inactive | Active. |
| (b) | 0.05 | Active | Do. |
|  | 0.025 | Inactive | Do. |
| (c) | 0.1 | do | Inactive. |

What we claim is:

1. A process for destroying insects which comprises contacting the insects with an insecticidal quantity of a compound of the formula

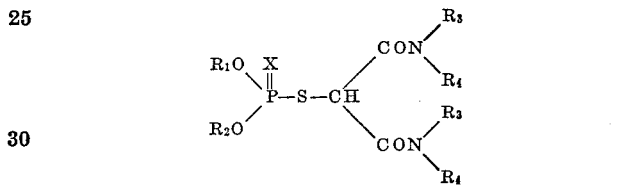

in which $R_1$ and $R_2$ is lower alkyl, X is a member selected from the group consisting of oxygen and sulfur, $R_3$ and $R_4$ are each selected from the group consisting of hydrogen, lower alkyl when considered separately and piperidino when taken with the nitrogen atom.

2. A process as in claim 1 wherein said compound has the formula:

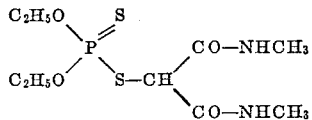

3. A compound as in claim 1 wherein said compound has the formula:

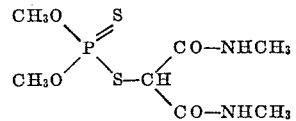

4. A process as in claim 1 wherein said compound has the formula:

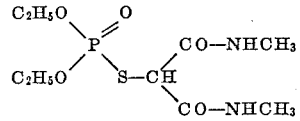

References Cited by the Examiner
UNITED STATES PATENTS
2,630,451 3/1953 Fletcher _____ 260—461

SAM ROSEN, *Primary Examiner.*

FRANK CACCIAPAGILA, JR., MORRIS O. WOLK, JULIAN S. LEVITT, L. B. RANDALL,
*Assistant Examiners.*